(12) United States Patent
Merrell

(10) Patent No.: US 12,476,445 B2
(45) Date of Patent: Nov. 18, 2025

(54) HOOK APPARATUS FOR HANGING A CABLE AND THE LIKE

(71) Applicant: Samuel B. Merrell, Austin, TX (US)

(72) Inventor: Samuel B. Merrell, Austin, TX (US)

(*) Notice: Subject to any disclaimer, the term of this patent is extended or adjusted under 35 U.S.C. 154(b) by 57 days.

(21) Appl. No.: 18/591,725

(22) Filed: Feb. 29, 2024

(65) Prior Publication Data

US 2024/0305082 A1    Sep. 12, 2024

Related U.S. Application Data

(60) Provisional application No. 63/489,063, filed on Mar. 8, 2023.

(51) Int. Cl.
*H02G 3/32* (2006.01)
(52) U.S. Cl.
CPC ..................... *H02G 3/32* (2013.01)
(58) Field of Classification Search
CPC ................. H02G 3/32; H02G 3/263
See application file for complete search history.

(56) References Cited

U.S. PATENT DOCUMENTS

| | | | |
|---|---|---|---|
| 4,559,677 A * | 12/1985 | Tracy | F16G 11/00 24/700 |
| D409,899 S | 5/1999 | Schrader | |
| 5,957,416 A * | 9/1999 | Sellati | H02G 3/26 248/68.1 |
| D417,386 S | 12/1999 | Huston | |
| 6,374,707 B1 * | 4/2002 | Browning | B25B 13/5091 81/119 |
| D458,831 S | 6/2002 | Selby | |
| D488,997 S | 4/2004 | Angeletta | |
| D551,541 S | 9/2007 | Kuo | |
| D555,460 S * | 11/2007 | Bimson | D8/367 |
| 7,516,930 B2 * | 4/2009 | Chen | F16B 45/00 248/304 |
| D608,185 S | 1/2010 | Gomez | |
| D626,402 S | 11/2010 | Chan | |
| D628,877 S | 12/2010 | Stevens | |
| D665,654 S | 8/2012 | Nommensen et al. | |

(Continued)

OTHER PUBLICATIONS

Cable Safe safety hook online product page dated by https://archive.org at Mar. 16, 2019 https://cablesafe.com/safety-hook/safety-hook/? (Year: 2019).*

(Continued)

*Primary Examiner* — Terrell L McKinnon
*Assistant Examiner* — Ding Y Tan
(74) *Attorney, Agent, or Firm* — HULSEY P.C.

(57) ABSTRACT

A hook apparatus for hanging a cable, extension cord box and the like is disclosed. The hook apparatus includes a shank and a bend portion. The bend portion extends from the shank. The shank includes a groove. The groove extends the entire length of the shank. The groove includes a first threaded portion, a second threaded portion and a third threaded portion. The first threaded portion has a larger diameter than the second threaded portion. The second threaded portion has a larger diameter than the third threaded portion. Each of the first threaded portion, the second threaded portion and the third threaded portion is configured to receive a connecting member of varied thickness. The connecting member connects to a ceiling. The hook apparatus receives the cable at the bend portion and helps to hold the cable in place and prevent the cable from sagging or drooping.

17 Claims, 7 Drawing Sheets

(56) References Cited

U.S. PATENT DOCUMENTS

| | | | |
|---|---|---|---|
| D694,613 S | | 12/2013 | Miles |
| D755,529 S | * | 5/2016 | Schlang .................. D8/367 |
| D804,938 S | | 12/2017 | Wesley |
| D809,354 S | * | 2/2018 | Richer ..................... D8/14 |
| D825,401 S | | 8/2018 | Stickles |
| D827,315 S | | 9/2018 | O'Sullivan |
| D834,338 S | | 11/2018 | O'Sullivan |
| D837,040 S | | 1/2019 | Connor et al. |
| D951,074 S | | 5/2022 | Sanders |
| D961,278 S | * | 8/2022 | Ho .......................... D6/328 |
| D1,001,623 S | * | 10/2023 | Yegenoglu .............. D8/367 |
| 11,815,122 B2 | * | 11/2023 | Bredl .................... A47G 25/32 |
| 2004/0060155 A1 | * | 4/2004 | Selby .................... F16G 11/143 |
| | | | 24/265 H |
| 2013/0331947 A1 | * | 12/2013 | Surma ................. A61B 17/1725 |
| | | | 606/99 |

OTHER PUBLICATIONS

Uxcell M10 hanger bolts sold on amazon.com first available date: Sep. 7, 2018, https://www.amazon.com/uxcell-M10x50mm-Hanger-Self-Tapping-Furniture/dp/B07H5MPVZH/ref=asc_df_B07H5MPVZH? (Year: 2018).*

Checkers Quick Hook Overhead Cable Protection online product page dated 2021, https://checkers.justrite.com/media/mageplaza/product_attachments/attachment_file/c/h/checkers_quick-hook_ck425-web_1.pdf (Year: 2021).*

Glove guard safe hook sold on amazon dated Jul. 2021, https://www.amazon.com/Glove-Guard-Extreme-Cable-Yellow/dp/B0BS1WVM9G/ (Year: 2021).*

Teesing "types of threads" catalog dated Aug. 2015, https://www.studocu.com/ec/document/universidad-de-las-fuerzas-armadas-de-ecuador/ingenieria-en-software/types-of-threads-sdf/44309616 (Year: 2015).*

* cited by examiner

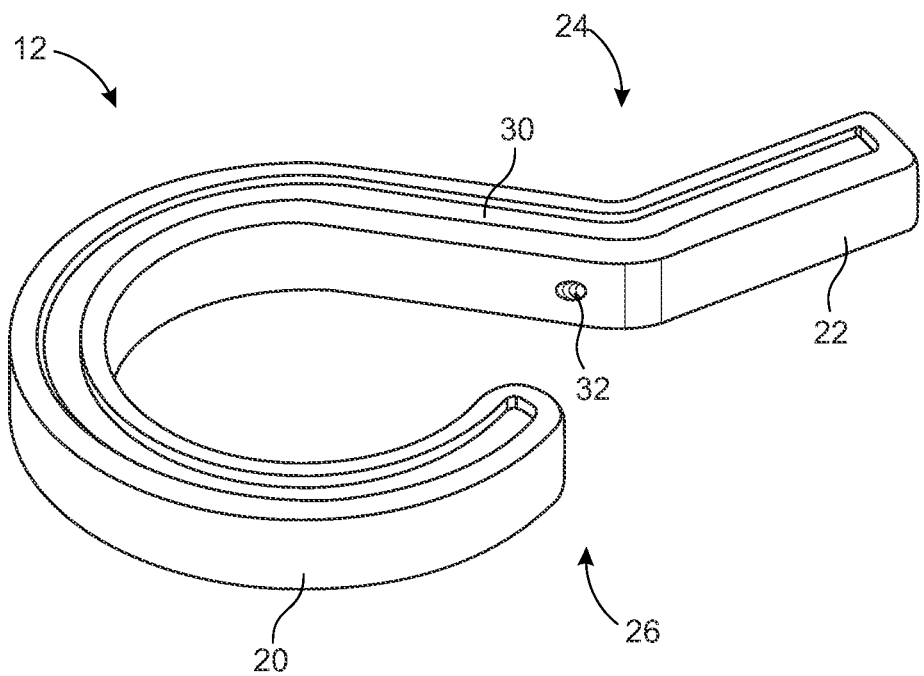
FIG. 2C
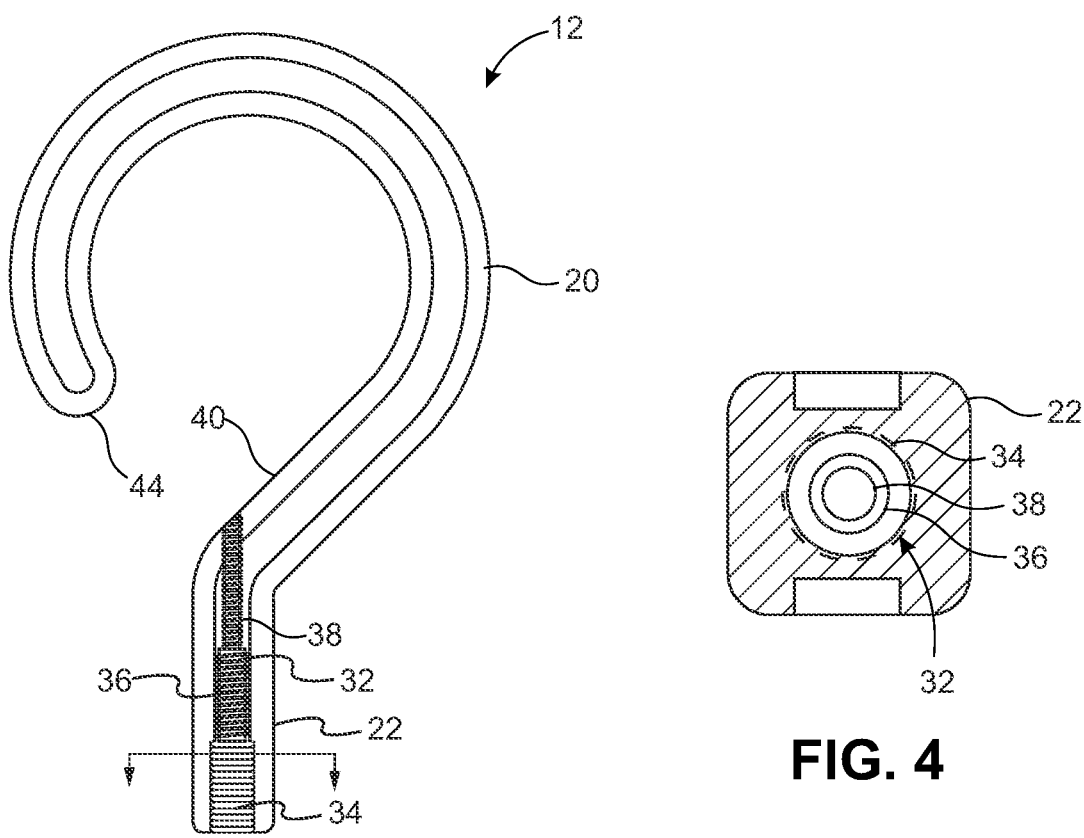
FIG. 3
FIG. 4

HOOK APPARATUS FOR HANGING A CABLE AND THE LIKE

REFERENCE TO RELATED APPLICATIONS

The present application claims the benefit of U.S. Provisional Patent Application No. 63/489,063 filed Mar. 8, 2023; all of which is incorporated herein by its entirety and referenced thereto.

FIELD OF THE INVENTION

The present invention generally relates to a field of hooks. More particularly, the present invention relates to a hook apparatus for hanging a cable, an extension cord box and the like from a ceiling of a structure.

BACKGROUND OF THE INVENTION

It is important to manage and organise cables properly at a construction site. Without proper management, loose cables can pose a lot of safety hazards. For instance, the loose cables on the ground can cause the occupants to trip and fall, leading to injuries. Further, the cables carrying electricity may pose the risk of electric shock, if not handled properly. Furthermore, the loose cables may cause damage to equipment placed in the construction site.

In order to overcome the problems associated with the loose cables, several solutions have been provided. Some of the solutions include providing covers for cables and securing the cables to walls or ceilings. Typically, the cables are secured to the walls or ceilings using cable clips, conduit clips or other type of tools. The clips or hooks hold the cables in place and prevent them from sagging or drooping.

Various clips or hooks have been disclosed in the past. Such an example is disclosed in a U.S. Publication No. 20040060155, entitled "Axial adjustable tie-down stretch cord terminus" ("the '155 Publication"). The '155 Publication discloses a terminus for a bungee cord has a hook with a transverse axis which is within a given distance of the longitudinal axis of a bore within the stem of the terminus. A cleat opens into a cord passage leading to the bore to permit pulling a cord into the cleat thereby locking the terminus in position on the cord. The relative axial alignment of the load in the cord with the transverse axis of the hook prevents the load from rotating the hook substantially. A land adjusts the thickness of the cleat.

Additional hooks are disclosed in U.S. Pat. No. Des. 951,074, U.S. Pat. No. Des. 628,877, and U.S. Pat. No. Des. 551, 541.

Although the above discussed disclosures are useful, still there is a need in the art to provide an improved hook apparatus for hanging a cord from a ceiling of a structure.

SUMMARY OF THE INVENTION

It is one of the main objects of the present invention to provide a hook apparatus that avoids the drawbacks of the prior art.

It is another object of the present invention to provide a hook apparatus for hanging a cable, extension cord box and the like.

In order to overcome the limitations here stated, the present invention provides a hook apparatus for hanging a cable, extension cord box and the like. The hook apparatus includes a shank and a bend portion. The bend portion extends from the shank. The shank includes a groove. The groove extends the entire length of the shank. Optionally, the groove extends partially along the length of the shank. Optionally, the hook apparatus comes without a groove on the sides i.e., at the shank.

The groove includes a first threaded portion, a second threaded portion and a third threaded portion. The first threaded portion has a larger diameter than the second threaded portion. The second threaded portion has a larger diameter than the third threaded portion. Each of the first threaded portion, the second threaded portion and the third threaded portion is configured to receive a connecting member of varied thickness. The connecting member connects to a ceiling. The hook apparatus receives the cable at the bend portion and helps to hold the cable in place and prevent the cable from sagging or drooping.

In one example, the groove includes only one threaded portion. Here, different hook apparatuses, each having groove of various diameter are used.

In one advantageous feature of the present invention, the hook apparatus helps to hang cables or extension cords from the roof or ceiling. Optionally, the hook apparatus helps to drape the cables around. This prevents the cables from sagging or drooping from the ceiling. This prevents the cords from being laid on the ground, creating tripping hazards, damage from construction equipment, and electrical shock hazards from wet weather events as buildings are not dried in during early phases of construction.

In another advantageous feature of the present invention, the hook apparatus is made of a non-conductive material and as such the hook apparatus does not conduct electricity. This prevents the users from electric shock.

In another advantageous feature of the present invention, the hook apparatus is removably connected to the connecting members. As such, the hook apparatus can be used with the connecting members of varied sizes. This helps to use the hook apparatus in any structure across various jurisdictions having different standard thickness for connecting members.

Features and advantages of the invention hereof will become more apparent in light of the following detailed description of selected embodiments, as illustrated in the accompanying FIGUREs. As will be realized, the invention disclosed is capable of modifications in various respects, all without departing from the scope of the invention. Accordingly, the drawings and the description are to be regarded as illustrative in nature.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2A, FIG. 2B and FIG. 2C illustrate a side perspective view, a bottom perspective view, and a top perspective view, respectively of the hook apparatus, in accordance with one embodiment of the present invention;

FIG. 3 illustrates a cross-sectional view of a groove, in accordance with one embodiment of the present invention;

FIG. 4 illustrates a sectional view of a shank having the groove with threaded portions of varied diameters, in accordance with one embodiment of the present invention;

DETAILED DESCRIPTION OF THE INVENTION

Figure 1:
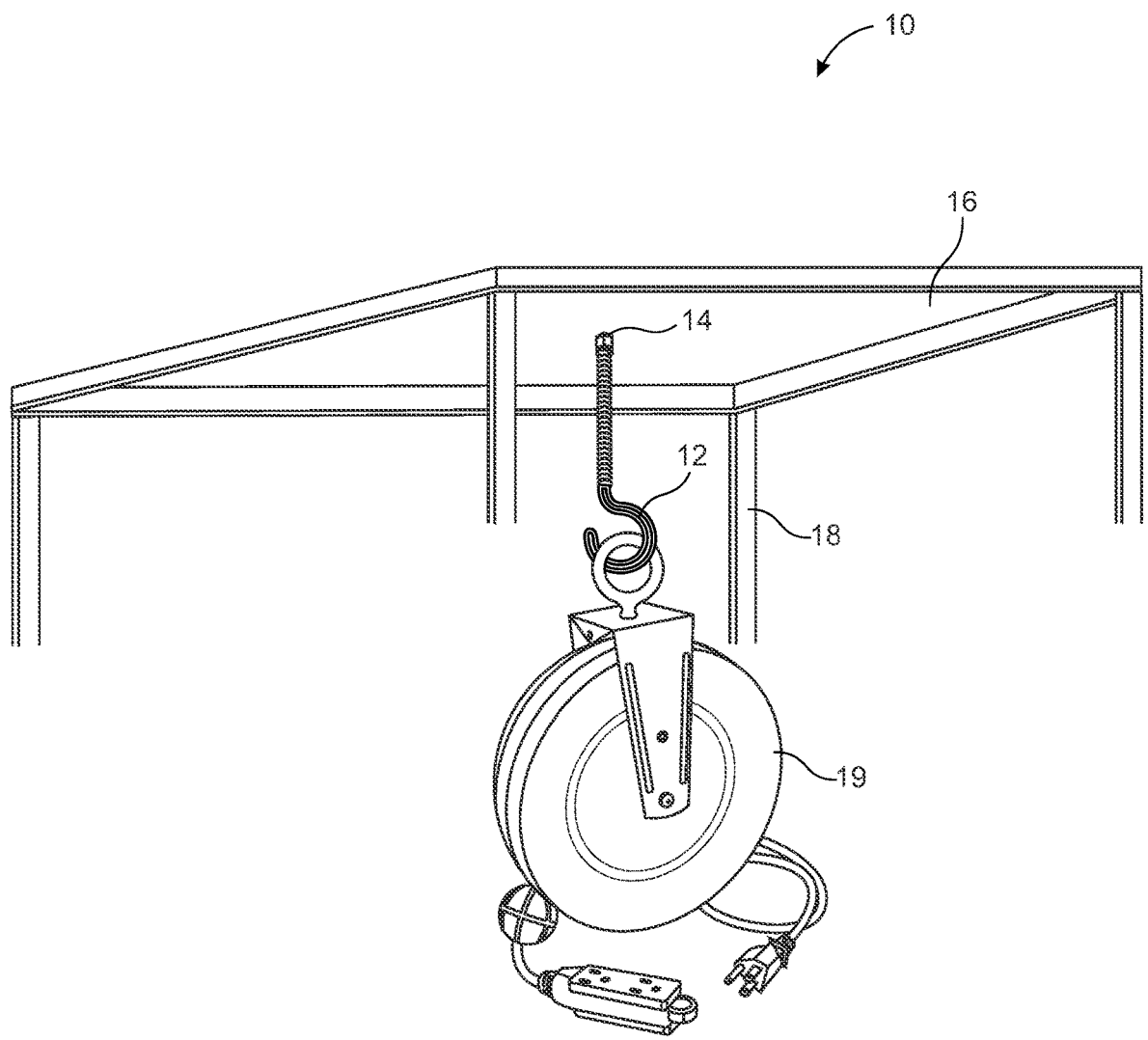
FIG. 1 illustrates an environment of a hook apparatus for hanging cables or extension cord boxes, in accordance with one embodiment of the present invention.

The following detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed hook apparatus. However, it will be apparent to those skilled in the art that the presently disclosed invention may be practiced without these specific details. In some instances, well-known structures and devices are shown in functional or conceptual diagram form in order to avoid obscuring the concepts of the presently disclosed hook apparatus.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention provides a description of a hook apparatus, it is to be further understood that numerous changes may arise in the details of the embodiments of the hook apparatus. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

The present invention discloses a hook apparatus for hanging a cable and the like. The hook apparatus includes a shank and a bend portion. The bend portion extends from the shank. The shank includes a groove. The groove extends the entire length of the shank. The groove includes a first threaded portion, a second threaded portion and a third threaded portion. The first threaded portion has a larger diameter than the second threaded portion. The second threaded portion has a larger diameter than the third threaded portion. Each of the first threaded portion, the second threaded portion and the third threaded portion is configured to receive a connecting member of varied thickness. The connecting member connects to a ceiling. The hook apparatus receives the cable at the bend portion and helps to hold the cable in place and prevent the cable from sagging or drooping.

Various features and embodiments of a hook apparatus are explained in conjunction with the description of FIGS. 1-8.

Referring to FIG. 1, an environment 10 of a hook apparatus 12 for hanging cables or extension cord boxes is shown, in accordance with one exemplary embodiment of the present invention. Hook apparatus 12 connects to a connecting member 14. In one example, connecting member 14 includes an allthread that extends from a ceiling 16 of a structure 18. Structure 18 includes, but not limited to, a building, wall, temporary structure, etc. Here, hook apparatus 12 connects to connecting member 14 and receives an extension cord box 19 or cables (not shown). In other words, hook apparatus 12 helps to hang extension cord box 19 or cable from ceiling 16 or walls depending on the need.

Figure 2A:
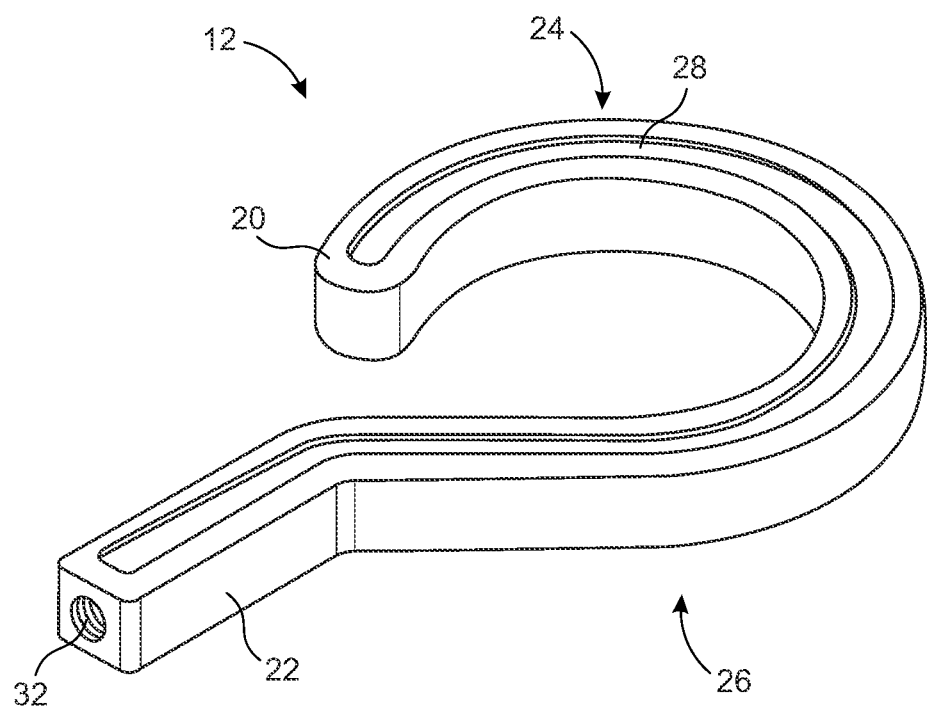
Figure 2B:
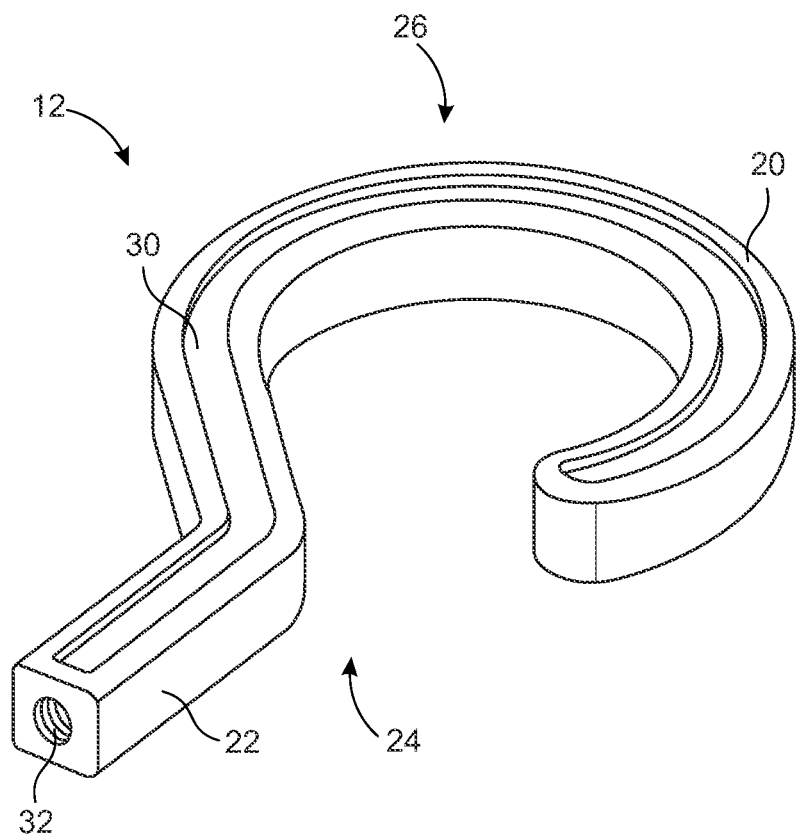

FIGS. 2A, 2B and 2C show a side perspective view, a bottom perspective view, and a top perspective view, respectively, of hook apparatus 12, in accordance with one embodiment of the present invention. Hook apparatus 12 is made of metal, hard plastic, or any other suitable material. It is preferable to make hook apparatus 12 using non-conductive material (e.g., plastic) to prevent it from conducting electricity via extension cord box 19 or cable. Hook apparatus 12 includes a bend portion 20 and a shank 22. As can be seen, shank 22 extends from bend portion 20. Shank 22 comes in at a relatively straight or 90-degree angle. Hook apparatus 12 includes a first end 24 and a second end 26. First end 24 indicates a top end of hook apparatus 12. Second end 26 indicates a bottom end of hook apparatus 12. Hook apparatus 12 includes a first recess section 28 at first end 24. First recess section 28 extends along the entire length of bend portion 20 and shank 22, as shown in at least FIGS. 2A and 2C. Hook apparatus 12 includes a second recess section 30 at second end 26. Second recess section 30 extends along the entire length of bend portion 20 and shank 22, as shown in at least FIG. 2B. First recess section 28 and second recess section 30 are formed by chipping away a small portion of material from hook apparatus 12. In one alternate embodiment, hook apparatus 12 comes without first recess section 28 and second recess section 30. Such an implementation falls within the scope of the present invention.

Figure 5:
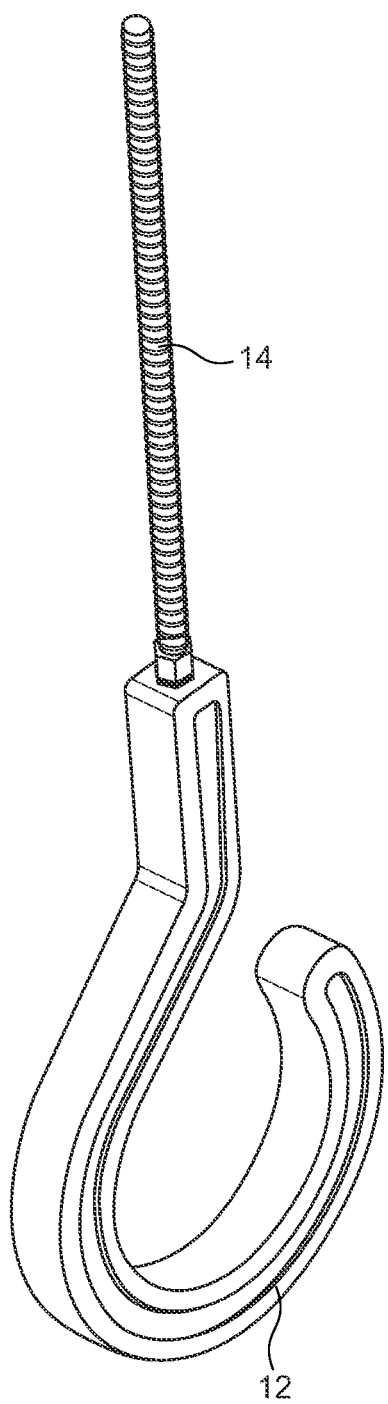
FIG. 5 illustrates a connecting member connected to the shank at the threaded portion, in accordance with one exemplary embodiment of the present invention.

In accordance with the present invention, hook apparatus 12 includes a groove or opening 32 at shank 22. Groove 32 extends along the entire length of shank 32. FIG. 3 shows a cross-sectional view of groove 32. Further, FIG. 4 shows a sectional view of shank 22. As can be seen, groove 32 includes a first threaded portion 34, a second threaded portion 36 and a third threaded portion 38. First threaded portion 34 has a larger diameter than second threaded portion 36. Further, second threaded portion 36 has a larger diameter than third threaded portion 38. In one example, each of first threaded portion 34, second threaded portion 36 and third threaded portion 38 extends approximately $1/3^{rd}$ length of shank 22. In another example, each of first threaded portion 34, second threaded portion 36 and third threaded portion 38 has different length from one another. In the above example, the combined length of first threaded portion 34, second threaded portion 36 and third threaded portion 38 cover the entire length of shank 22. Each of first threaded portion 34, second threaded portion 36 and third threaded portion 38 is configured to receive connecting member 14 of varied thickness. Consider that the diameter of connecting member 14 is same as first threaded portion 34, then connecting member 14 inserts through groove 32 and connects at first threaded portion 34. FIG. 5 shows connecting member 14 connected to shank 22 at first threaded portion 34, in accordance with one exemplary embodiment of the present invention. In another example, if the diameter of connecting member 14 is same as third threaded portion 38, then connecting member 14 inserts through groove 32 and connects at third threaded portion 38. This way, hook apparatus 12 connects to connecting member 14 having varied thickness using one of first threaded portion 34, second threaded portion 36 and third threaded portion 38.

Optionally, shank 22 includes only one threaded portion such as first threaded portion 34, or second threaded portion 36 or third threaded portion 38. In such an embodiment, multiple hook apparatuses 12, each having groove 32 of various diameter is used.

In operation, a user (not shown) connects hook apparatus 12 to connecting member 14 via shank 22. Subsequently, the user connects cable or extension cord box 19 at bend portion 20. Bend portion 20 helps to hold cable or extension cord 19 hold the in place and prevent cable or extension cord box 19 from sagging or drooping, as shown in FIG. 1, for example. When not in use, the user uninstalls hook apparatus 12 from connecting member 14 and stores it.

Figure 6:
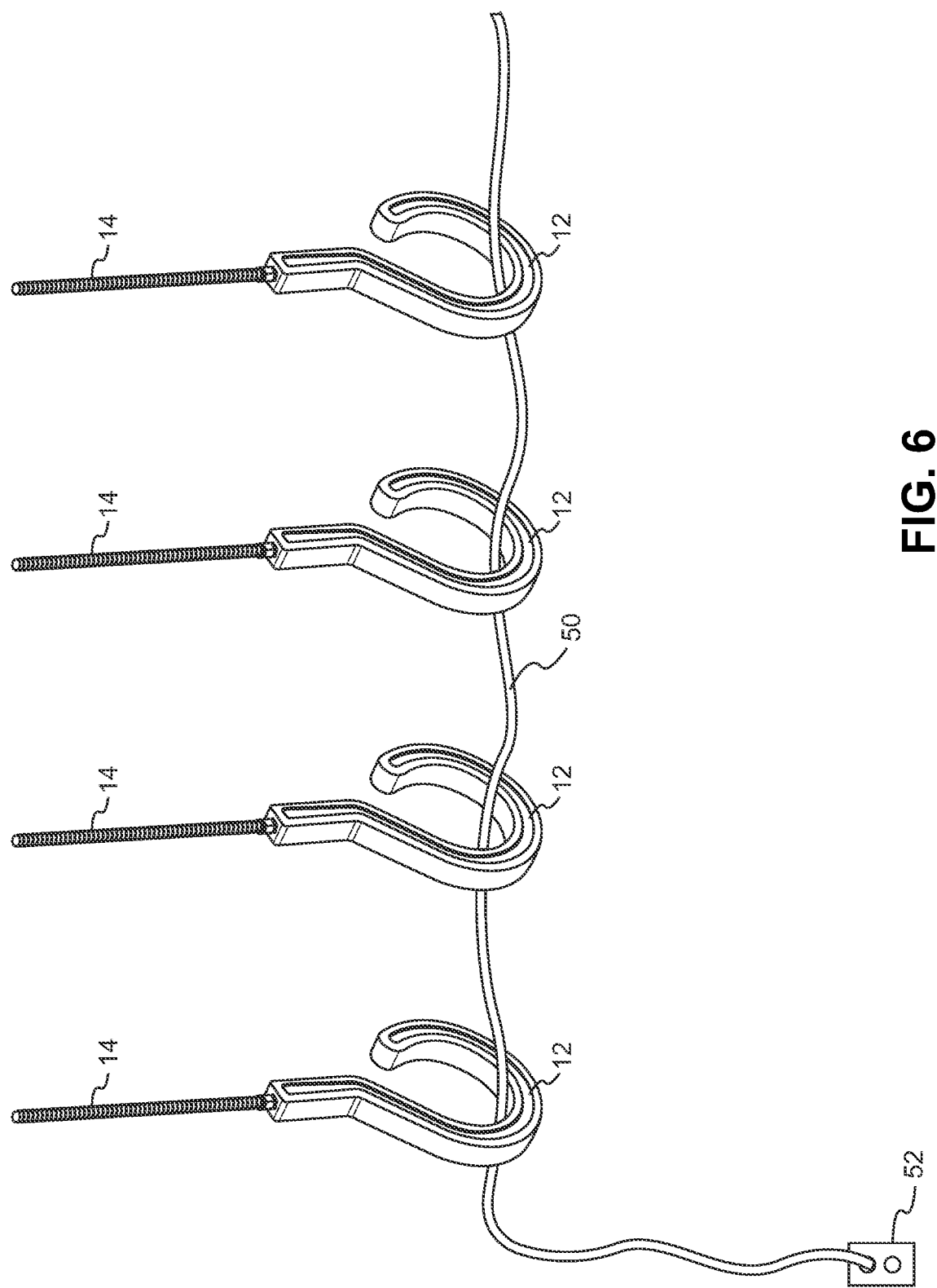
FIG. 6 illustrates a cable hanging with the help of a plurality of hook apparatuses, in accordance with one embodiment of the present invention.

In one embodiment, a plurality of hook apparatuses 12 are used to hang or drape a cable 50. Here, plurality of hook apparatuses 12 are mounted to ceiling 16 via connecting members 14, as shown in FIG. 6. Cable 50 is drawn and connected to a power source or an electric outlet 52. A person skilled in the art understands that hook apparatuses 12 can be arranged in any fashion depending on the need to drape or hand cables 50 or extension cords 19 or any other object in the structure 18. For example, hook apparatuses 12 can be used support light strings (not shown). Here, the light strings are suspended or connected to the ceiling temporarily to provide light during the construction.

Figure 7:
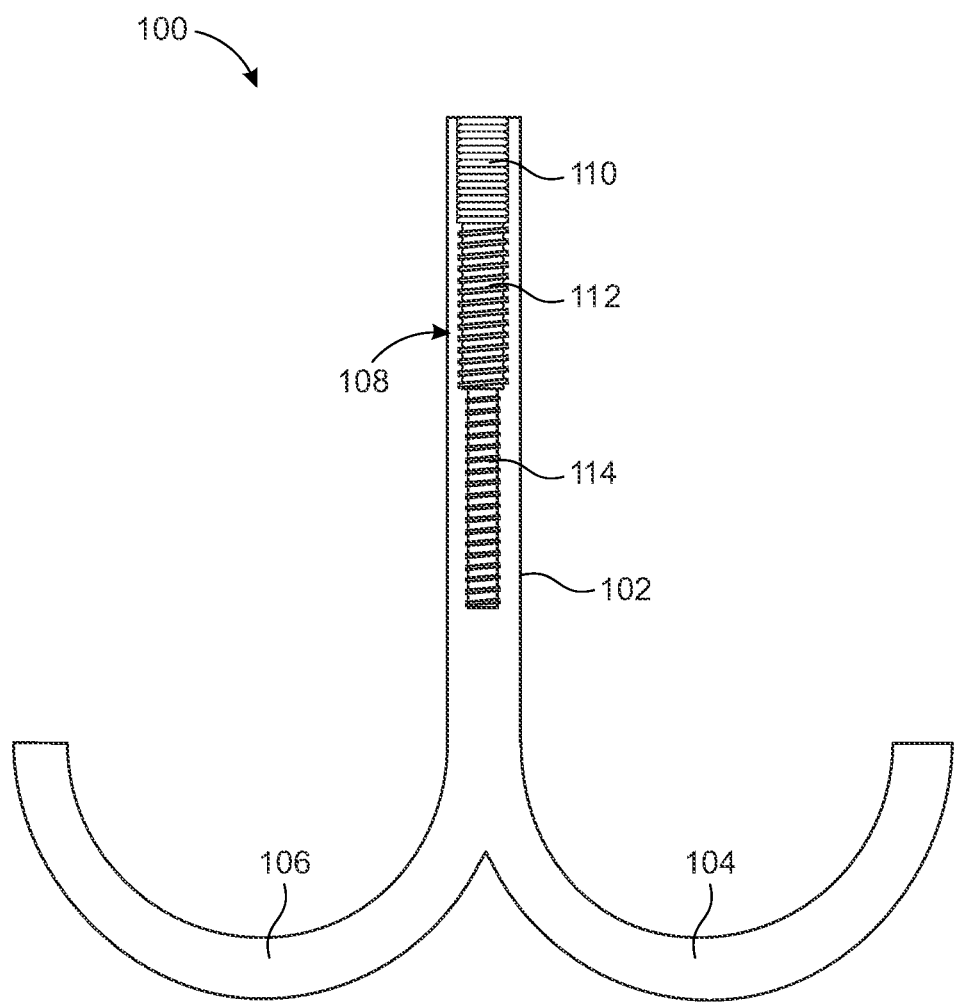
FIG. 7 illustrates a schematic view of a hook apparatus, in accordance with another embodiment of the present invention.

FIG. 7 shows a schematic view of hook apparatus 100, in accordance with another embodiment of the present invention. Hook apparatus 100 is made of metal, hard plastic, or any other suitable material. It is preferable to make hook apparatus 100 using a non-conductive material to prevent it from conducting electricity. Hook apparatus 100 includes a shank 102, a first bend portion 104 and a second bend portion 106. Each of first bend portion 104 and second bend portion 106 extends from shank 102. As can be seen from FIG. 7, first bend portion 104 and second bend portion 106 extend in opposite directions. As such, each of first bend portion 104 and second bend portion 106 helps to hold two or more cables or extension cords (not shown) in side-by-side configuration.

In the present embodiment, shank 102 includes a groove 108. Here, groove 108 extends approximately half the length of shank 102. Groove 108 includes a first threaded portion 110, a second threaded portion 112 and a third threaded portion 114. As can be seen, first threaded portion 110 has a larger diameter than second threaded portion 112. Further, second threaded portion 112 has a larger diameter than third threaded portion 114. Groove 108 includes all the features and operates similar to groove 32, as explained above.

Figure 8:
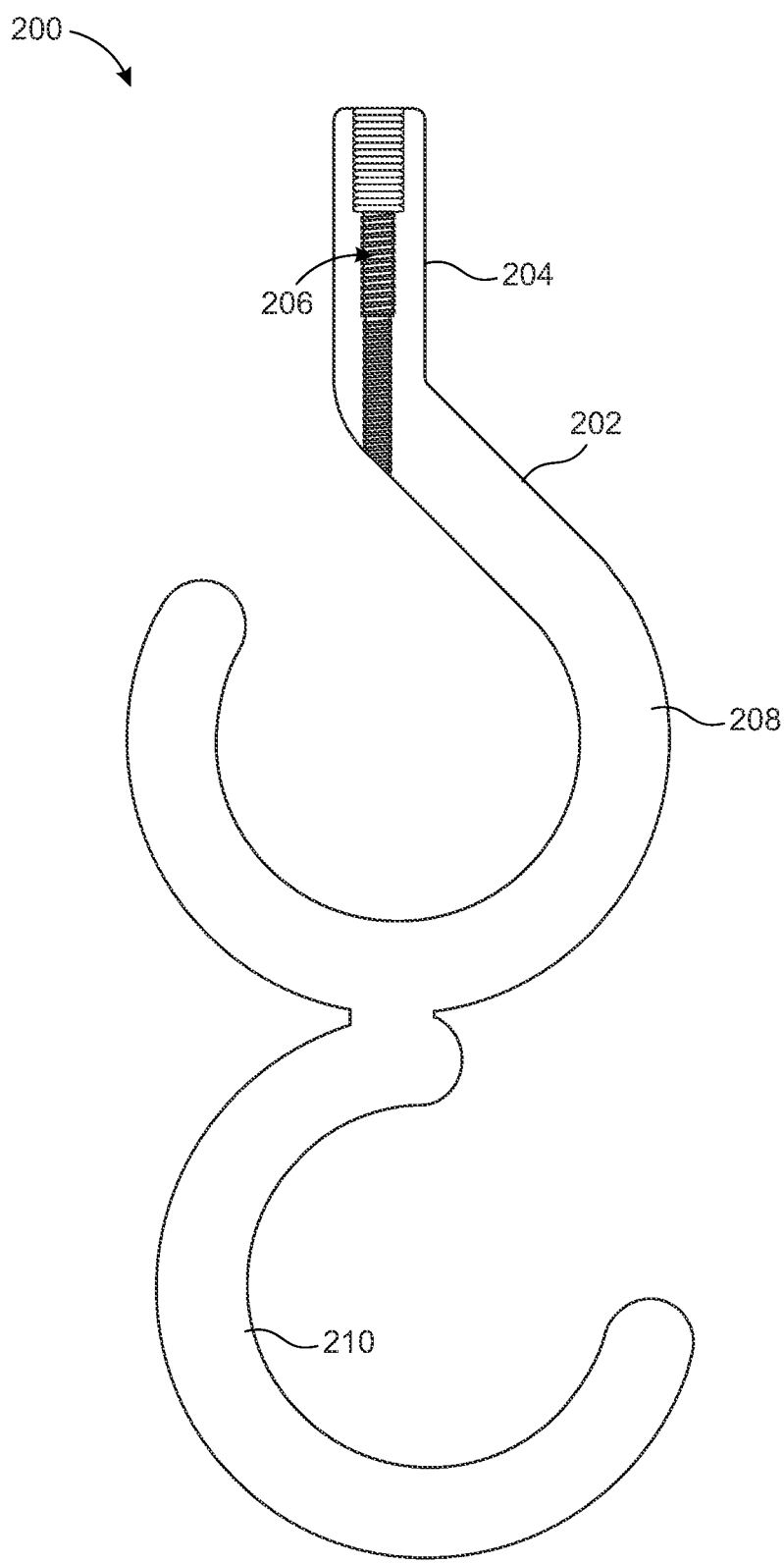
FIG. 8 illustrates a schematic view of a hook apparatus, in accordance with another embodiment of the present invention.

FIG. 8 shows a schematic view of hook apparatus 200, in accordance with another embodiment of the present invention. Hook apparatus 200 is made of metal, hard plastic, or any other suitable material. It is preferable to make hook apparatus 200 using a non-conductive material to prevent it from conducting electricity. Hook apparatus 200 includes a first hook 202. First hook 202 includes a shank 204 having a groove 206, similar to groove 32, as explained above. First hook 202 includes a first bend portion 208 extending from shank 204. Further, first bend portion 208 includes a second bend portion 210. As can be seen, second bend portion 210 extends from first bend portion 208. Here, each of first bend portion 208 and second bend portion 210 helps to hold two or more cables or extension cords one above the other.

In one alternative embodiment, the hook apparatus comes in S-shaped configuration. Here, the shank comes at the top of S-shaped configuration, and S-shaped member helps to draw and holds cables therethrough.

Based on the above, it is evident that the presently disclosed hook apparatus can be used to hang cables or extension cords from the roof. The hook apparatus is made of a non-conductive material. As such, the hook apparatus prevents the user from electric shock. Further, the hook apparatus helps to hang the cables or extension cords safely at the top i.e., to the roof thereby allowing them to work in a safe working condition. Furthermore, the hook apparatus can be easily removed and installed at an appropriate location depending on the need. Optionally, the hook apparatus is used as a hanger hook for hanging items from the ceiling or wall depending on the need.

A person skilled in the art appreciates that the hook apparatus can come in a variety of shapes and sizes depending on the need and comfort of the user. Further, many changes in the design and placement of components may take place without deviating from the scope of the presently disclosed hook apparatus.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A hook apparatus, comprising:
   a shank;
   a bend portion extending from said shank; and
   a groove positioned entirely inside of said shank, wherein said groove extends along the length of said shank, wherein said groove comprises a first threaded portion, and a second threaded portion, wherein said first threaded portion positions at a distal end of said shank, wherein said second threaded portion extends from said first threaded portion, wherein said first threaded portion has a larger diameter than said second threaded portion, wherein said first threaded portion and said second threaded portion are arranged in a step-like structure, and
   wherein said groove receives a connecting member in order to connect said hook apparatus to a structure, and wherein said bend portion receives a cable or an extension box.

2. The hook apparatus of claim 1, wherein said groove further comprises a third threaded portion, wherein said third threaded portion extends from said second threaded portion, wherein said second threaded portion has a larger diameter than said third threaded portion, and wherein said third threaded portion is arranged in said step-like structure with respect to said second threaded portion.

3. The hook apparatus of claim 1, wherein said connecting member comprises an allthread.

4. The hook apparatus of claim 2, wherein a diameter of said connecting member matches a diameter of one of said first threaded portion, said second threaded portion, and said third threaded portion.

5. The hook apparatus of claim 1, wherein said shank comes in a straight configuration.

6. The hook apparatus of claim 1, wherein said bend portion comprises a hook.

7. The hook apparatus of claim 1, wherein said bend portion comprises a first hook and a second hook, each extending from said shank in opposite directions.

8. The hook apparatus of claim 1, wherein said bend portion comprises a first hook and a second hook, wherein said first hook extends from said shank, and wherein said second hook extends from said first hook.

9. The hook apparatus of claim 1, wherein said groove extends the entire length of said shank.

10. A hook apparatus, comprising:
    a shank;
    a bend portion extending from said shank; and
    a groove positioned entirely inside of said shank and extending along the entire length of said shank, wherein said groove comprises a first threaded portion, a second threaded portion, and a third threaded portion, wherein said first threaded portion positions at a distal end of said shank, wherein said second threaded portion extends from said first threaded portion, wherein said first threaded portion has a larger diameter than said second threaded portion, wherein said third threaded portion extends from said second threaded portion, wherein said second threaded portion has a larger diameter than said third threaded portion, wherein said first threaded portion and said second threaded portion, and said third threaded portion are arranged in a step-like structure, and wherein said groove receives a connecting member having a diameter matching one of said first threaded portion and said second threaded portion in order to connect said hook apparatus to a structure, and wherein said bend portion receives a cable or an extension box.

11. The hook apparatus of claim 10, wherein said connecting member comprises an allthread.

12. The hook apparatus of claim 10, wherein said shank comes in a straight configuration.

13. The hook apparatus of claim 10, wherein said bend portion comprises a hook.

14. The hook apparatus of claim 10, wherein said bend portion comprises a first hook and a second hook, each extending from said shank in opposite directions.

15. The hook apparatus of claim 10, wherein said bend portion comprises a first hook and a second hook, wherein said first hook extends from said shank, and wherein each said second hook extends from said first hook.

16. A method of providing a hook apparatus, said method comprising the steps of:
    providing a shank;
    providing a bend portion extending from said shank;
    providing a groove positioned entirely inside of said shank, said groove extending along the length of said shank;
    receiving a connecting member at said groove for connecting said hook apparatus to a structure;
    providing a first threaded portion, a second threaded portion and a third threaded portion at said groove, said first threaded portion having a larger diameter than said second threaded portion, and said second threaded portion having a larger diameter than said third threaded portion;
    positioning said first threaded portion at a distal end of said shank such that said second threaded portion extends from said first threaded portion, and wherein said third threaded portion extends from said second threaded portion;
    arranging said first threaded portion and said second threaded portion, and said third threaded portion in a step-like structure; and
    receiving a cable or an extension box at said bend portion.

17. The method of claim 16, further comprising:
    receiving said connecting member having a diameter matching a diameter of one of said first threaded portion, said second threaded portion, and said third threaded portion.

* * * * *